July 6, 1937.  A. Y. DODGE  2,086,491
VARIABLE SPEED TRANSMISSION
Filed April 11, 1932   5 Sheets-Sheet 1

INVENTOR.
A. Y. Dodge
BY
Jones, Addington, Ames & Seibold
ATTORNEYS

July 6, 1937.   A. Y. DODGE   2,086,491
VARIABLE SPEED TRANSMISSION
Filed April 11, 1932   5 Sheets-Sheet 2
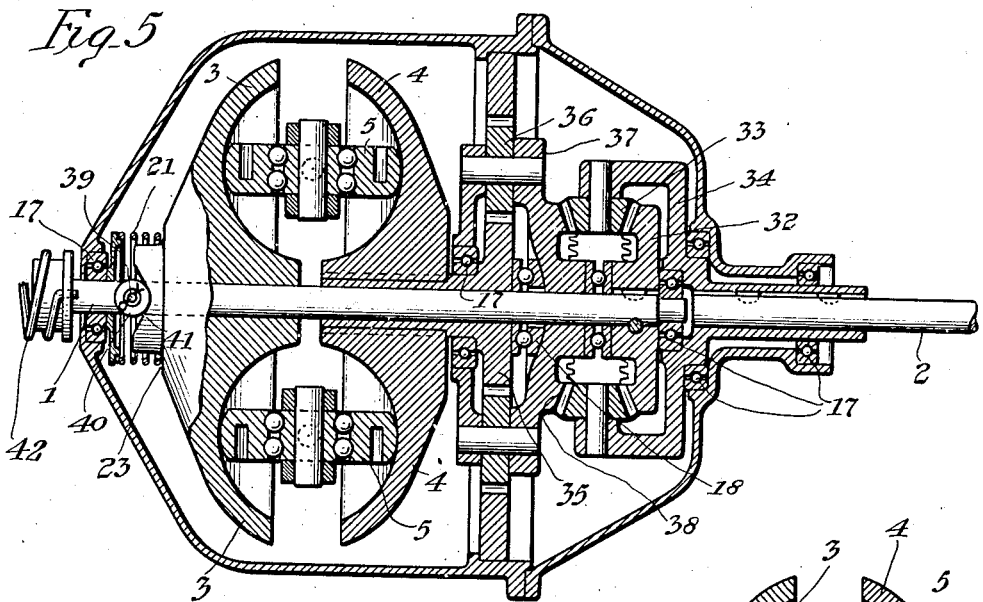
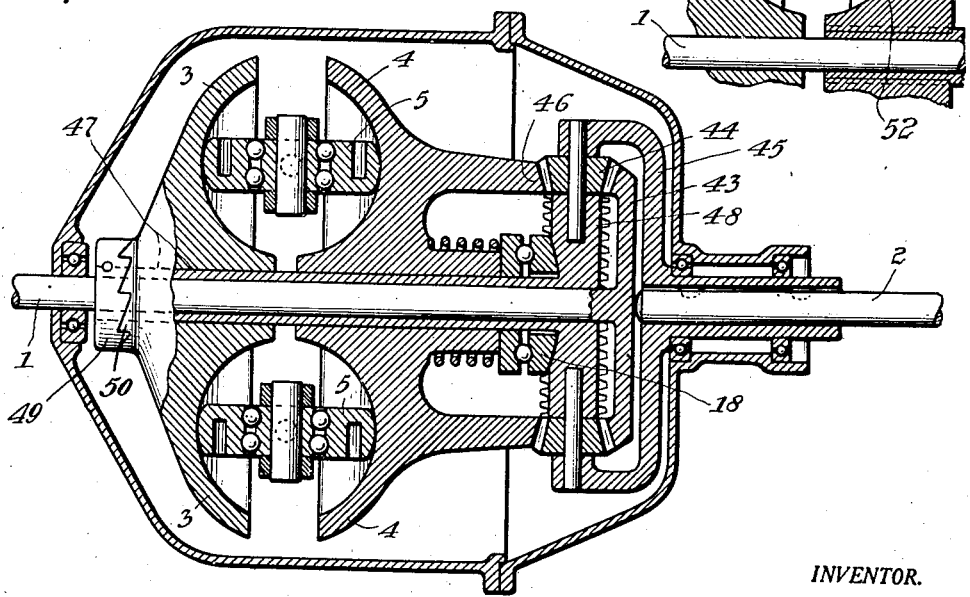
INVENTOR.
A. Y. Dodge
BY Jones, Addington, Ames & Seibold
ATTORNEYS

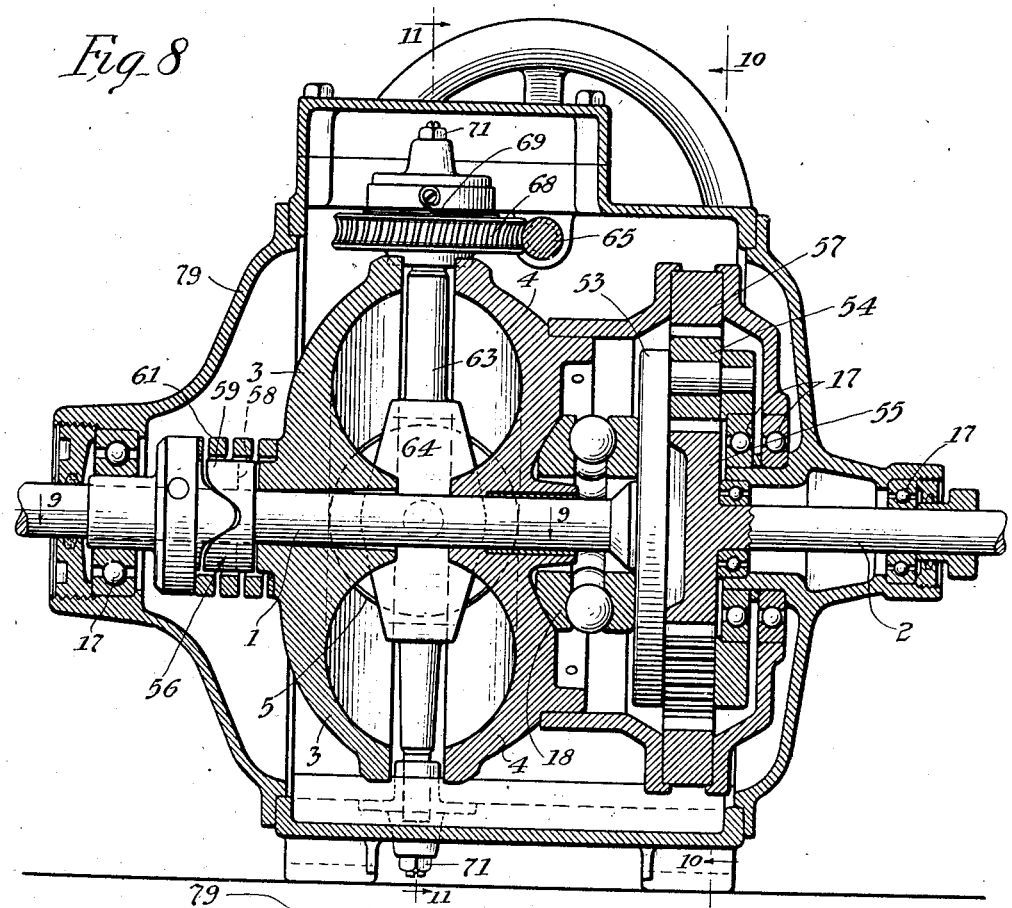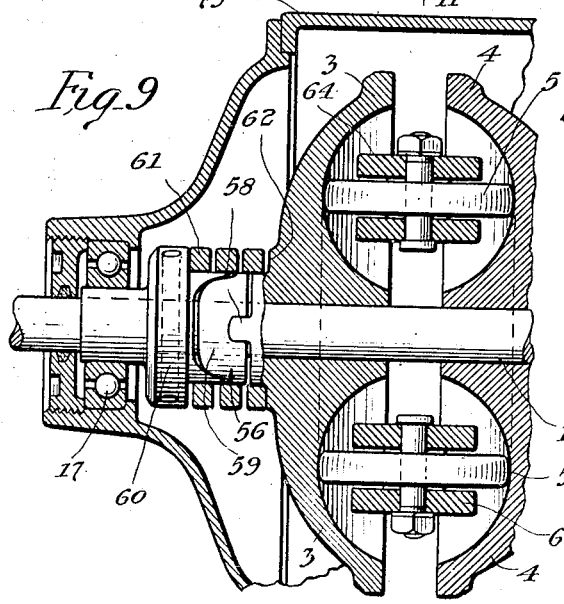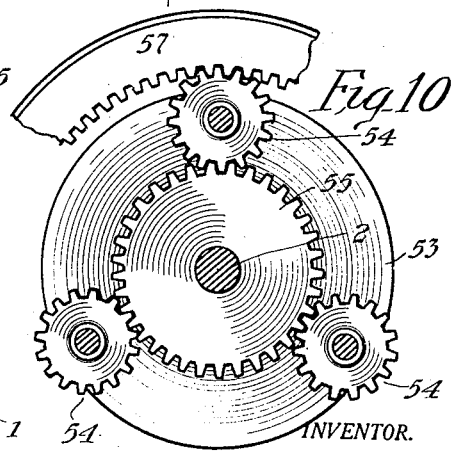

July 6, 1937.  A. Y. DODGE  2,086,491
VARIABLE SPEED TRANSMISSION
Filed April 11, 1932   5 Sheets-Sheet 4
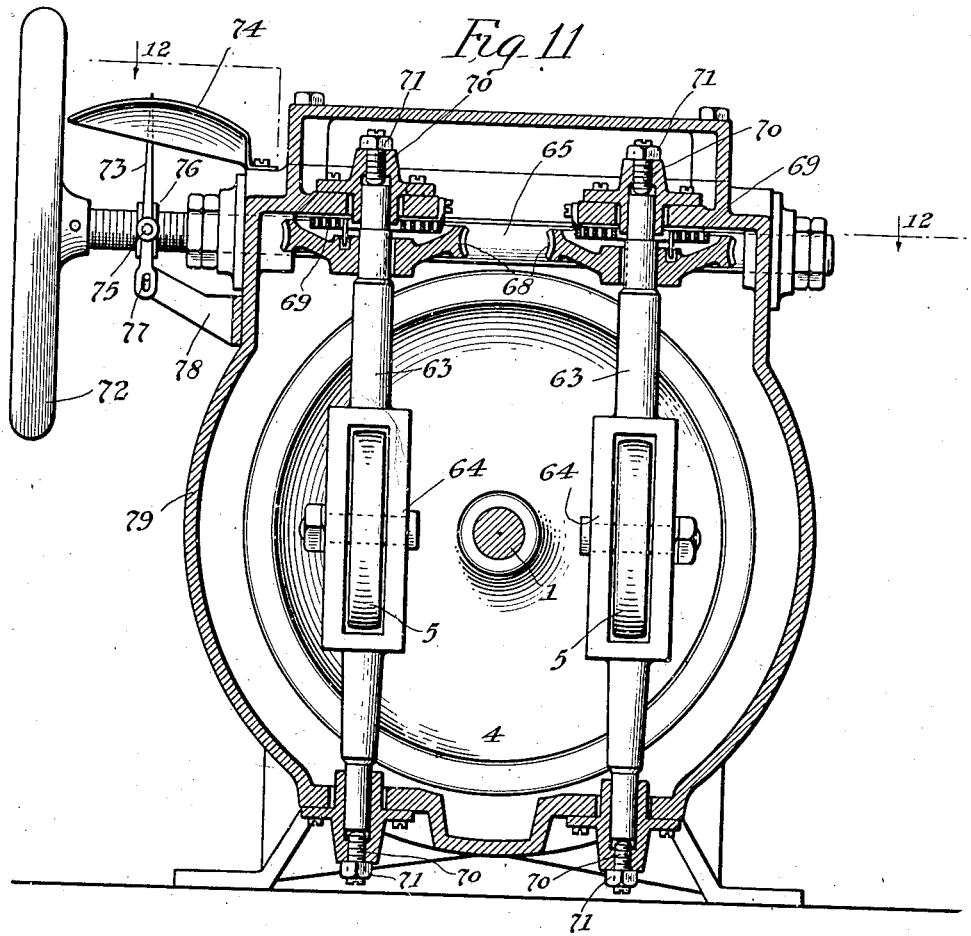
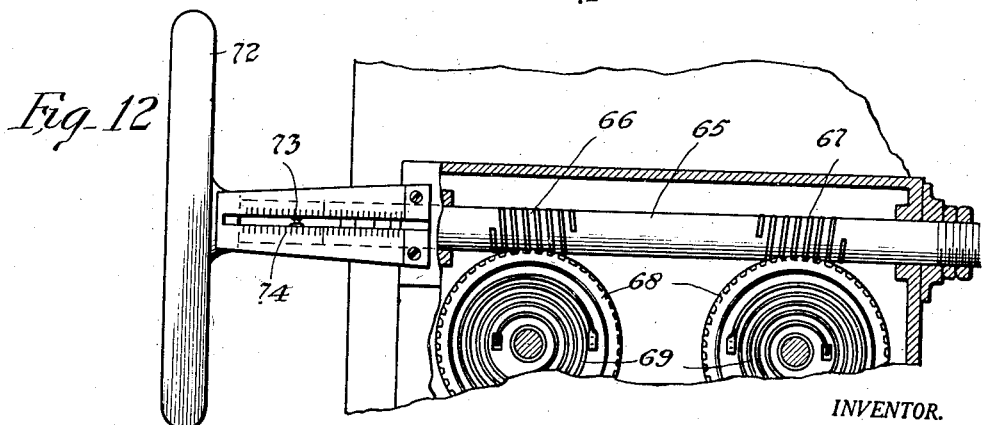
INVENTOR.
A. Y. Dodge
BY
Jones, Addington, Ames, & Seibold
ATTORNEYS July 6, 1937.  A. Y. DODGE  2,086,491
VARIABLE SPEED TRANSMISSION
Filed April 11, 1932   5 Sheets-Sheet 5

INVENTOR.
A. Y. Dodge
BY Jones, Addington, Ames & Seibold
ATTORNEYS

Patented July 6, 1937

2,086,491

UNITED STATES PATENT OFFICE 2,086,491

VARIABLE SPEED TRANSMISSION

Adiel Y. Dodge, South Bend, Ind.

Application April 11, 1932, Serial No. 604,372

10 Claims. (Cl. 74—285)

The present invention relates to variable speed transmissions and more particularly to transmissions employing grooved driving and driven wheels and traction rollers to transmit the drive therebetween.

One of the objects of the invention is to provide a transmission including a plurality of traction rollers in which the rollers may be simultaneously adjusted to vary the transmission ratio, one or more of the rollers preferably being independently adjustable with respect to the others to permit proper alinement of the rollers.

Another object is to provide a transmission including adjustable rollers in which back lash of the rollers is prevented.

Another object is to provide a transmission including rollers in which the rollers are mounted for limited movement along their rotational axes to permit self-alinement, the rollers preferably being resiliently urged axially to assure wedging contact with the wheels.

The transmission preferably includes a gear chain and it is a further object of the invention to provide a novel arrangement of the traction unit and the gear chain in which the traction unit carries only a portion of the transmitted torque.

Further objects will appear from the description and claims.

Many unsuccessful attempts have been made to use friction gearing of this type. I find that success may be had by using suitable hard surface toroidal wheels and rollers, presenting a very small area of contact, if and provided the parts are accurately made and still more accurately set in place. I also find that the toroidal wheels will in a measure locate themselves to the traction rollers if given a certain degree of freedom. This freedom must be dampened and limited. I find one practical way to accomplish this is to make free fits between the toroidal wheels and the shaft on which they are mounted (from .007 to .012 free). Oil will fill this capillary space and dampen the tendency to flutter. By proper use of self aligning surfaces at the ends of the hubs of the toroidal wheels, the self aligning is not overly restricted. By this method I get self alignment and a good measure of self equalization of the load between the rollers used. Means of adjustment should be provided so that the rollers may be located accurately in respect to all three planes taken at right angles to each other and in angular relation to each other. I also find it desirable to allow one or both rollers to float laterally a small amount on the axes about which it or they spin.

While the term friction drive has been used more or less consistently in this application, applicant prefers the term traction drive and the term traction wheel. Therefore, the term friction wheel is used not by preference but due to its more common usage in the art up to the present time. Where the term traction wheel is used it may be considered synonymous with cases where friction wheel is used in this application.

In the drawings, in which several forms of my invention are shown,

Fig. 5 is an axial sectional view of another form of transmission;

Fig. 6 is an axial sectional view of still another form;

Fig. 7 is an axial sectional view showing another form of friction roller mounting;

Fig. 8 is an axial sectional view of another form of transmission;

Fig. 9 is a section on the line 9—9 of Fig. 8;

Fig. 10 is a section on the line 10—10 of Fig. 9;

Fig. 11 is a section on the line 11—11 of Fig. 9;

Fig. 12 is a view on the line 12—12 of Fig. 11;

Figure 1:
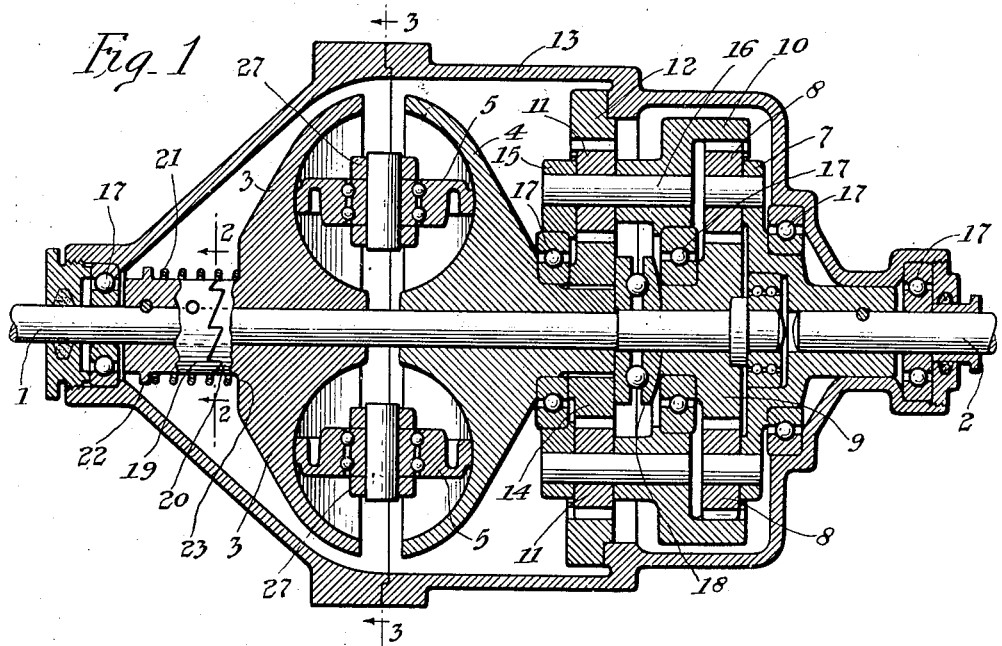
Figure 1 is an axial section of a friction wheel planetary gear transmission.
Figure 2:
Fig. 2 is a detailed section on the line 2—2 of Fig. 1.

Referring to the drawings in detail, and first to Figs. 1 to 4, inclusive, the transmission shown comprises a driving shaft 1, a driven shaft 2, and transmission from said driving shaft to said driven shaft comprising a friction wheel 3 rotatable with the driving shaft and having a toroidal friction surface, a second friction wheel 4 rotatable about said shaft and also having a toroidal friction surface, a pair of friction rollers or discs 5 engaging both toroidal surfaces, and mounted for oscillation about an axis tangential to the directrix of the toroidal friction surfaces, and a differential transmission for transmitting power over two paths to the driven shaft, whereby the speed of the driven shaft 2 is dependent upon the speed both of the friction wheel 4 and of the driving shaft 1. It will be noted that the friction wheel 4 must always rotate in the opposite direction from friction wheel 3, since the intermediate friction rollers 5 serve merely as idlers to reverse the direction of rotation. By rocking the shafts 6 on which the mounting means for the friction rollers 5 are carried, the relative speed of rotation of the two friction wheels may be controlled. With the proportions shown in Fig. 1, the speed may vary from the ratio of five to one down to a ratio of one to five.

The differential transmission from the two friction wheels to the driven shaft comprises a gear carrier 7 secured to the driven shaft 2, planet gearing 8 mounted on said gear carrier, a sun gear 9 meshing with said planet gearing 8 and mounted on the drive shaft 1, a combination ring gear and gear carrier having a ring gear portion 10 meshing with the planet gearing 8 and carrying a second set of planet gearing 11, a stationary ring gear 12 secured to the housing 13, and a sun gear 14 meshing with the second set of planet gearing 11 and rotatable with the friction wheel 4. A stiffening ring 15 is provided for the gear carrier carried by the pins 16 on which the second set of planet gearing 11 is mounted. Suitable radial ball bearings 17 are provided for the first gear carrier 7, the second gear carrier 10, the driving shaft 1, and the driven shaft 2. A suitable self-aligning thrust bearing 18 is provided to take the reaction due to the thrust load imposed on rollers 5.

Means are provided whereby the pressure of the friction wheels 3 and 4 against the idler friction rollers 5 is proportional to the load on the driven shaft 2, comprising a clutch-like member 19 fixedly secured to the driving shaft 1, and a corresponding clutch-like member 20 formed on the friction wheel 3. A constant initial pressure of the friction wheels on the idler friction disc is provided by means of a coil compression spring 21 acting between a collar 22 on the clutch-like member 19 and a shoulder 23 on the friction wheel 3. With this construction, the load on the driven shaft will cause a tendency of the friction wheel 3 to lag, and this lag will tend to cause a relative axial movement of the two clutch-like members 19 and 20 because of the sloping interengaging faces of these clutch-like members. This relative axial movement of the clutch-like members will cause the friction wheels 3 and 4 to grip the idler friction discs 5, since the righthand friction wheel is held against axial movement on the shaft by a thrust bearing 18. Thus, the greater the load on the driven shaft, the greater will be the pressure of the friction wheels against the idler friction discs.

Figure 3:
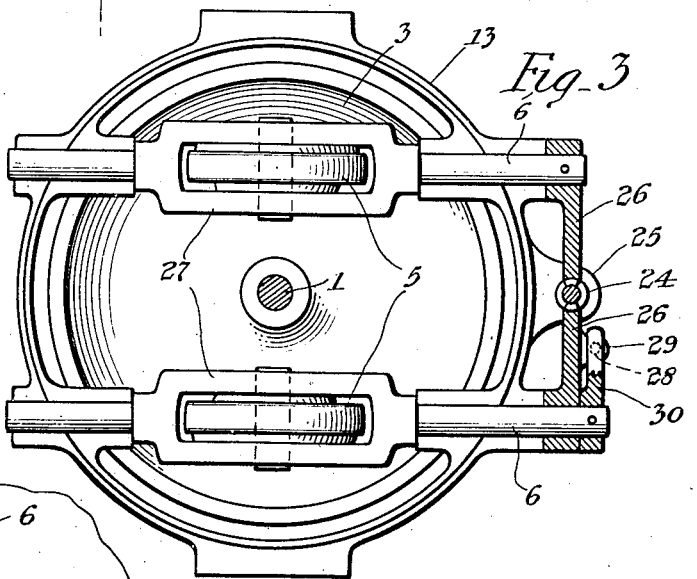
Fig. 3 is a section on the line 3—3 of Fig. 1.
Figure 4:
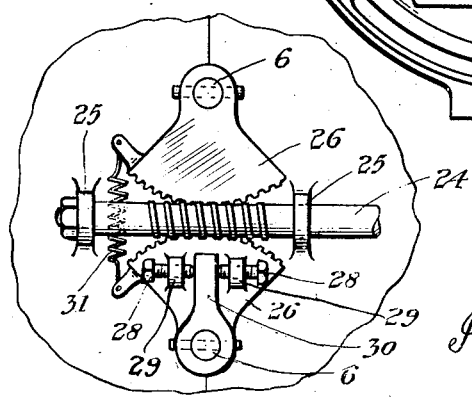
Fig. 4 is a detailed, elevational view from the right of Fig. 3.

The means for rocking the idler wheels or discs, shown in Figs. 3 and 4, comprises a worm shaft 24 mounted in suitable bearings 25 in the casing 13, and a pair of segmental worm gears 26 secured on the rock shafts 6 which carry the mounting yokes 27 for the idler friction wheels 5. In order to secure just the right adjustment of the idler friction wheels with respect to each other, means are provided whereby one of the segmental gears 26 may be angularly adjusted with respect to its rock shaft 6, comprising a pair of adjusting screws 28 threaded in suitable supporting lugs 29 on the segmental gear 26 and having their points engaging opposite sides of a rock arm 30 fixedly secured to the rock shaft 6. In order to prevent back lash, suitable spring means are provided for biasing the segmental gears, comprising a coil tension spring 31 secured to lugs on the segmental gears.

In operation, power applied to the driving shaft 1 is transmitted to the driven shaft 2 along two paths. One path is from the driving shaft 1 through the sun gear 9, planet gearing 8, and gear carrier 7 to the driven shaft. The other path is through the friction wheel 3, idler friction discs 5, friction wheel 4, sun gear 14, planet gearing 11, ring gear 10, planet gearing 8, and gear carrier 7 to the driven shaft 2. A study of the transmission will show that the ring gear 10 must always rotate in a direction opposite to that of the sun gear 9; hence the effect of the rotation of the ring gear 10 is subtractive with respect to that of the sun gear 9. As a matter of fact, reverse rotation of the ring gear 10 may be made to overcome the effect of the forward rotation of the sun gear 9 and effect a reverse rotation of the gear carrier 7 with respect to the driving shaft 1. With the arrangement and proportions shown, the proportion of power sent direct through the sun gear and planet gearing to that sent through the friction wheels and discs may be maintained at a ratio not to exceed .30% through rollers.

The construction shown in Fig. 5 is substantially equivalent to that of Fig. 1, except that beveled gearing is used in the differential transmission instead of sun and ring gears, and that a somewhat different form of pressure-inducing construction is provided for the friction wheels. In this form also, force is transmitted from the driving to the driven shaft through two paths. One path is from the driving shaft 1 through the bevel gear 32 and bevel pinion 33 to the gear carrier 34, which is secured to the driven shaft 2. The other path is through the friction wheels 3 and 4 and friction discs 5 to the sun gear 35 and through the planet gearing 36 to the gear carrier 37, which is provided with a beveled gear portion 38 meshing with the beveled pinions 33 on the gear carrier 34. The planet gearing meshes with a fixed ring gear secured to the casing, as in Fig. 1.

The pressure-inducing construction comprises a pair of rollers 39 mounted on opposite ends of a pin 40 extending through the drive shaft 1, which rollers engage in V-shaped notches 41 formed on the friction wheel 3. The action of the rollers 39 and notches 41 is substantially the same as the action of the clutch-like formations 19 and 20 of Fig. 1, except that the construction of Fig. 5 would be operative to induce a gripping action regardless of the direction in which the driving shaft might be rotated.

A suitable flexible transmission may be provided ahead of the driving shaft in the form of a torsion spring 42. In this form, suitable radial ball bearings 17 are provided for the gear carriers 34 and 37, sun gear 35, and driving shaft 1, and a suitable self-aligning thrust bearing 18 is provided to support the sun gear 35 and friction wheel 4 against axial movement.

In Fig. 6, also, power is transmitted from the driving shaft to the driven shaft along two paths. The friction wheel and friction disc construction may be substantially the same as that of Figs. 1 and 5. One of the paths from the driving shaft to the driven shaft is through the bevel gear 43, bevel pinions 44, and gear carrier 45 on which the bevel pinions 44 are mounted, which gear carrier 45 is secured to the driven shaft 2. The other path is from the bevel pinions 44, through bevel gear 46 formed on the friction wheel 4, friction discs 5, friction wheel 3, and sleeve 47 with which the friction wheel 3 has a lost motion, self-energizing connection, to the gear carrier 48, which may be formed as an integral part of the sleeve. In this form, a self-aligning thrust bearing is provided between the friction wheel 4 and the gear carrier 48.

The self-energizing connection shown comprises a pair of clutch-like members 49 and 50 which cooperate with the rest of the structure in the same manner as the cam members 19 and 20 of Fig. 1.

In some cases, I may find it desirable to secure a relatively high pressure between the friction wheels and friction discs in which case I may provide a coil compression spring 52 (Fig. 7) for exerting pressure in an axial direction on the idler roller 5 to cause a binding action to be exerted between the edges of the idler roller and toroidal friction surfaces.

In Fig. 8, shaft 2 is the driving or input shaft and shaft 1 is the driven or output shaft. One of these paths is to the driven shaft 1 through the gear carrier 53 and planet gearing 54 mounted on the gear carrier 53 from the sun gear 55 mounted on the driving shaft 2. The other path is through the lost-motion, self-energizing connection 56, through the friction wheels 3 and 4 and friction rollers 5, through the ring gear 57 from the planet gearing 54 and through the sun gear 55 from the driving shaft. In this form suitable radial ball bearings 17 are provided for the driving shaft 1, ring gear 57, gear carrier 53 and driven shaft 2. A suitable self-aligning thrust bearing 18 is provided between the friction wheel and the gear carrier.

The self-energizing connection 56 is made self-aligning by the provision of a pair of fulcrum members 58 on opposite sides of the hub of the friction wheel 3, one of the clutch members 59 being rockably mounted on these fulcrum members. The other fulcrum member 60 is pinned to the shaft 1 and a spring 61 is provided between the collar of the clutch member 60 and the shoulder 62 on the friction wheel 3.

I have found it desirable to keep the radial load on the friction rollers nearly constant and rate the capacity of the machine in horse power at the different ratios of speed reduction accordingly. In such cases I find it desirable to have the spring load about 25% of the total radial load and to use a cam angle at the fulcrum 60 of about 60 degrees, giving a wedging leverage of about five-tenths to one. This leverage with the leverage due to the roller 5 contacts with wheel 3 at a radius larger than the mean radius of cam 60, and, due to the angles assumed by the rollers 5 with the direction of force, a different overall leverage is secured for each station that rollers 5 assume. In many cases this ratio of spring and cam angle gives the most desirable torque or horse power rating.

Figure 13:
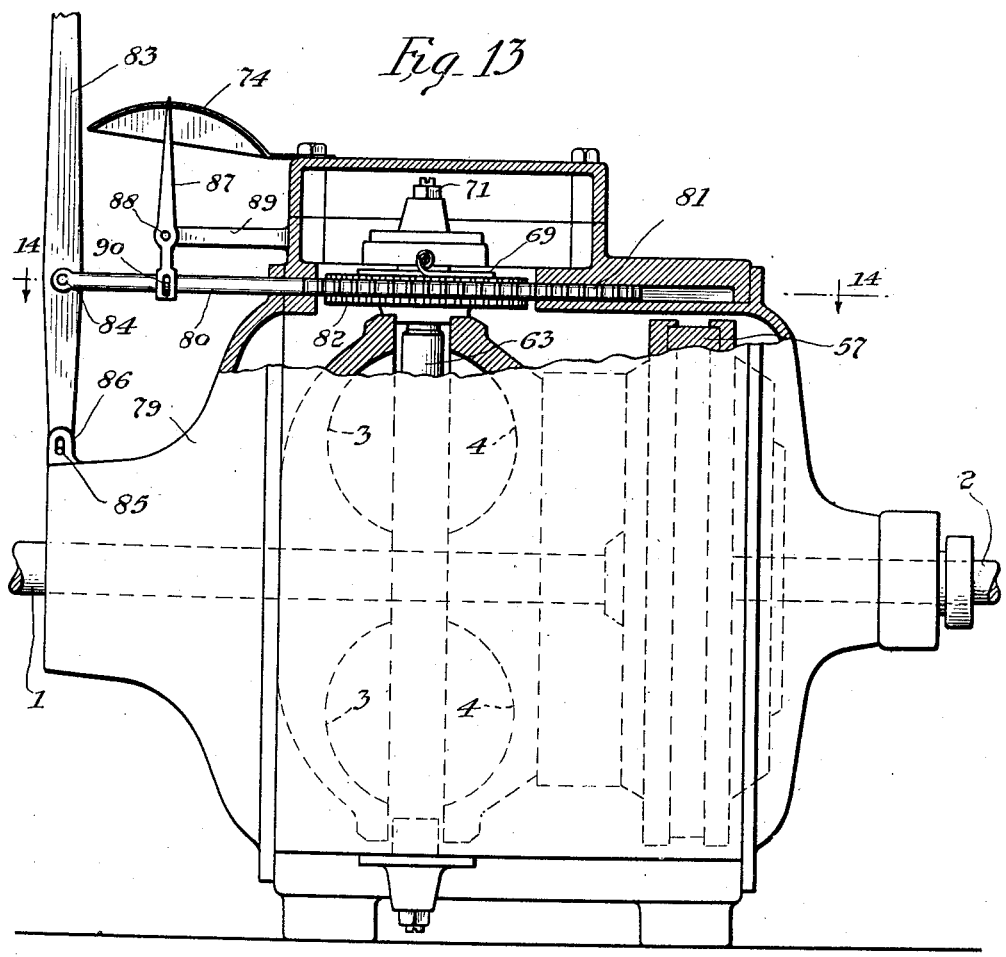
Fig. 13 is a side elevational view showing a modified form of control.

The means for rocking the shafts 63 which carry the mounting means 64 for the idler rollers 5 (as shown in Figs. 12 and 13) comprise a worm 65 provided with right and left hand threads 66 and 67, respectively, and a pair of worm wheels 68 meshing with these right and left hand threads, respectively, and secured to the rock shafts 63 which carry the idler rollers.

The worm gears may be provided with suitable spiral biasing springs 69 to prevent back lash. The proper axial adjustment of the rock shafts may be secured by means of adjusting screws 70 engaging the ends of the rock shafts 63 and provided with lock nuts 71 for holding them in proper adjusted position. A suitable hand wheel 72 may be provided for operating the worm shaft 65. By means of adjustment nuts at the ends of worm shaft 65, lateral adjustment is provided. By this means the rollers may be brought to a proper angular relation to each other. Suitable indicating means may be provided for showing the speed ratio, comprising a pointer 73 cooperating with a scale 74 mounted on the casing. This pointer 73 may be pivotally mounted on trunnions 75 extending from a feed nut 76 having a threaded engagement with the worm shaft 65 so that as the worm shaft is rotated the feed nut 76 will be shifted back and forth. The lower end of the pointer 73 is provided with a pin and slot connection 77 with a bracket 78 secured to the casing 79, the slot enabling the pointer 73 to adapt itself to the movement required by the feed nut 76.

Figure 14:
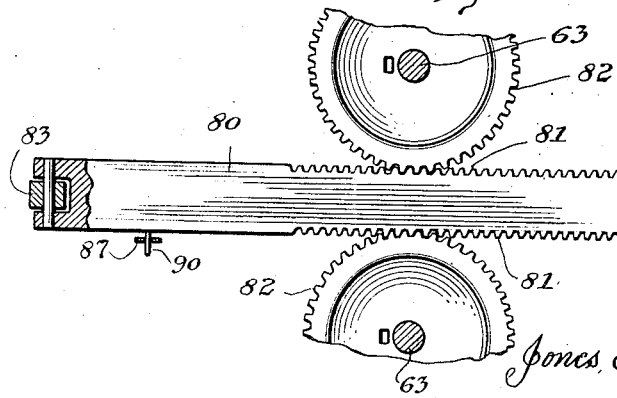
Fig. 14 is a sectional view on the line 14—14 of Fig. 13.

In Figs. 13 and 14 is shown an alternative form for adjusting the rock shafts 63 comprising a slide 80 having a pair of racks 81 formed on its opposite edges for cooperation with a pair of gears 82 secured to the rock shafts 63, respectively. The slide may be operated in any suitable manner, as by means of a lever 83 pivotally secured at 84 to the slide 80 and having a pin and slot connection at 85 with ears 86 on the casing 79. The indicator may be similar to that of Fig. 11, except that the pointer 87 is pivotally mounted at 88 on a bracket 89 on the casing and has a pin and slot connection at 90 with the operating slide 80. This latter control is more suitable for use when a transmission of one of my forms is used in an automobile.

The traction unit per se and the arrangement thereof with a gear chain are broadly claimed in my copending application Serial No. 29,797 and it is not my intention to claim herein anything which is claimed in that application.

Further modifications will be apparent to those skilled in the art and it is desired, therefore, that the invention be limited only by the prior art and the scope of the appended claims.

Having thus described my invention, what I claim and desire to secure by Letters Patent is:

1. A friction planetary transmission comprising a pair of friction wheels having opposed annular grooves, adjustable rotatable friction means engaging said grooves for effecting a variable speed transmission between said friction wheels, a planetary gearing comprising two coaxial gears, a gear carrier, and planet gearing on said gear carrier meshing with said coaxial gears, one of said coaxial gears being driven at the same speed as one of said friction wheels, and transmission from the other friction wheel to the other coaxial gear comprising a gear rotatable with said friction wheel, a stationary gear, a gear carrier rotatable with said coaxial gear, and planet gearing mounted on said gear carrier and meshing with said stationary gear and with the gear which is rotatable with said friction wheel.

2. A variable speed transmission comprising a rotatable driving shaft, a friction member rotatable with said shaft having a toroidal friction surface, a second friction member rotatable on said shaft also having a toroidal friction surface, said toroidal surfaces having substantially a common circular directrix, a circular friction disc oscillatable about a diametral axis tangential to said directrix and rotatable about an axis perpendicular to the plane of the disc and engaging both toroidal surfaces, and means pressing said friction disc axially to cause a wedging action with respect to the toroidal surfaces.

3. A friction planetary transmission comprising a pair of friction wheels having opposed annular grooves, angularly adjustable rotatable friction means engaging said grooves for effecting a variable speed transmission between said friction wheels, said rotatable friction means comprising a pair of rollers on opposite sides of the axis of the friction wheels, means for mounting said rollers for rotation about their axes, respectively, a pair of parallel rock shafts for rocking said mounting means, respectively, means for rocking said shafts comprising a pair of toothed gear means on said shafts, respectively, a common toothed member engaging the teeth of said gear members for actuating them, and means for angularly adjusting one of said rock shafts with respect to its gear member.

4. A friction planetary transmission comprising a pair of friction wheels having opposed annular grooves, angularly adjustable rotatable friction means engaging said grooves for effecting a variable speed transmission between said friction wheels, said rotatable friction means comprising a pair of rollers on opposite sides of the axis of the friction wheels, means for mounting said rollers for rotation about their axes, respectively, a pair of parallel rock shafts for rocking said mounting means, respectively, means for rocking said shafts comprising a pair of toothed gear means on said shafts, respectively, a common toothed member engaging the tooth of said gear members for actuating them, and spring means biasing said gear members to prevent back lash with respect to said common actuator.

5. A friction planetary transmission comprising a pair of friction wheels having opposed annular grooves, angularly adjustable rotatable friction means engaging said grooves for effecting a variable speed transmission between said friction wheels, said rotatable friction means comprising a pair of rollers on opposite sides of the axis of the friction wheels, means for mounting said rollers for rotation about their axes, respectively, a pair of parallel rock shafts for rocking said mounting means, respectively, means for rocking said shafts comprising a pair of toothed gear means on said shafts, respectively, a common toothed member engaging the tooth of said gear members for actuating them, means for angularly adjusting one of said rock shafts with respect to its gear member, and spring means biasing said gear members to prevent back lash with respect to said common actuator.

6. A variable speed transmission comprising two co-axial toroidal wheels, one of which is freely mounted and backed up by a self-aligning member, traction rollers located between the toroidal wheels, means to adjust the axial position of the traction rollers, and means to adjust the traction rollers in angular relation to each other.

7. A friction planetary transmission comprising a pair of friction wheels having opposed annular grooves, a pair of parallel rock shafts extending between said wheels on opposite sides of the axis thereof, toothed gears on said rock shafts, a common toothed member engaging said gears for rocking said shafts, means for angularly adjusting one of said rock shafts with respect to its gear, spindles carried by said rock shafts substantially at right angles to the axes thereof, traction rollers mounted on said spindles for free rotational and limited axial movement, and resilient means urging said rollers in one direction axially of said spindles.

8. A variable speed transmission comprising two coaxial toroidal wheels, a traction roller mounted between said wheels and lying substantially perpendicular to tangents to the toroidal surfaces thereof at the points of contact of the roller therewith, means for urging said wheels relatively together to exert pressure on the roller, and an axle supporting the roller for free rotational and limited axial movement, whereby the roller will adjust itself under the influence of pressure exerted thereon by said means to a position in which it is substantially perpendicular to said toroidal surfaces.

9. A variable speed transmission comprising two coaxial toroidal wheels, a traction roller mounted between said wheels and lying substantially perpendicular to tangents to the toroidal surfaces thereof at the points of contact of the roller therewith, means for urging said wheels relatively together to exert pressure on the roller, an axle supporting the roller for free rotational and limited axial movement, and means for yieldingly urging the roller in one direction on said axle, whereby the roller will adjust itself under the influence of pressure exerted thereon by said means to a position in which it is substantially perpendicular to said toroidal surfaces.

10. A variable speed transmission comprising two coaxial toroidal wheels, a self-aligning member backing up one of said wheels whereby it may align itself with the other wheel, at least two traction rollers mounted between the wheels and lying substantially perpendicular to tangents to the toroidal surfaces thereof at the points of contact of the rollers therewith, means for urging the wheels relatively together to exert pressure on the rollers, and axles supporting the rollers for free rotational and limited axial movement, whereby the rollers will adjust themselves to the toroidal surfaces under the influence of pressure exerted thereon by said means and said one wheel will align itself to a position determined by the rollers.

ADIEL Y. DODGE.